UNITED STATES PATENT OFFICE.

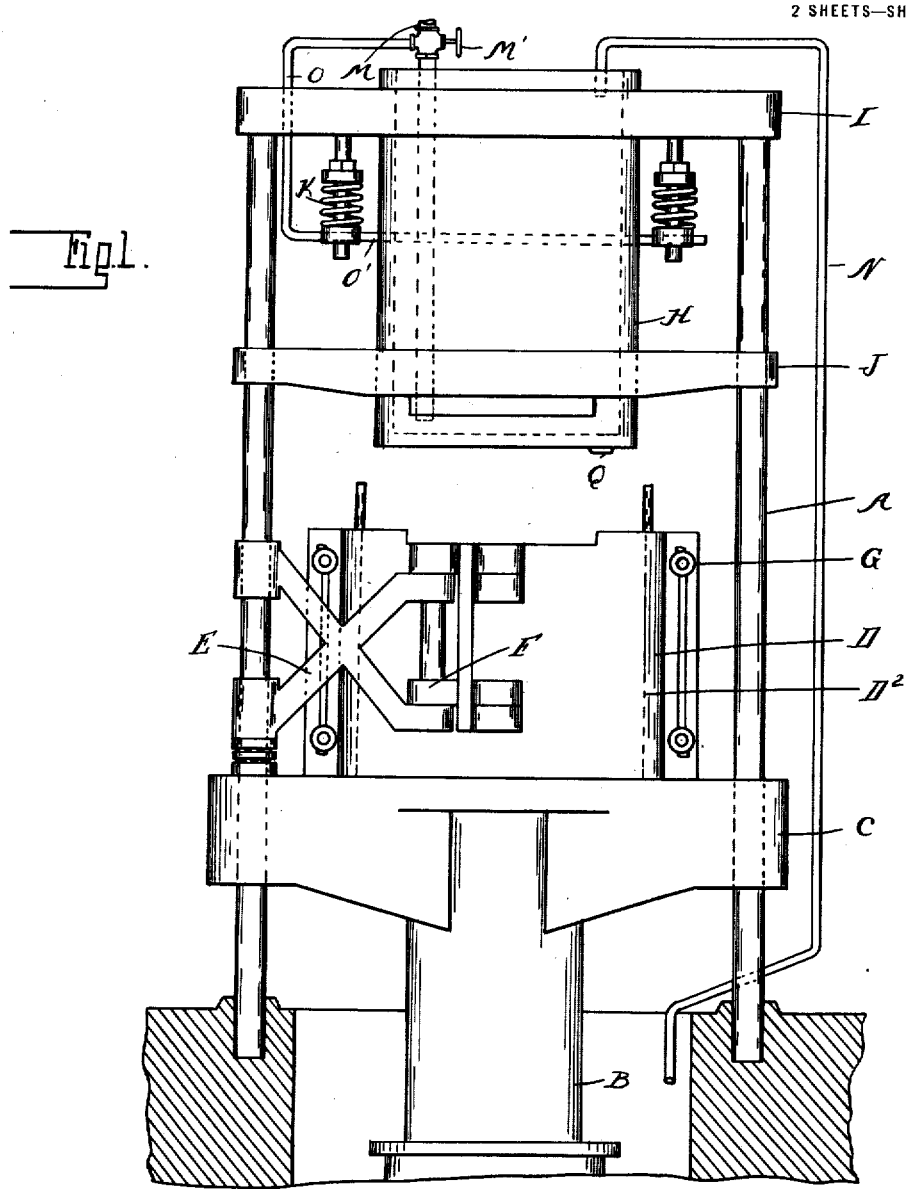

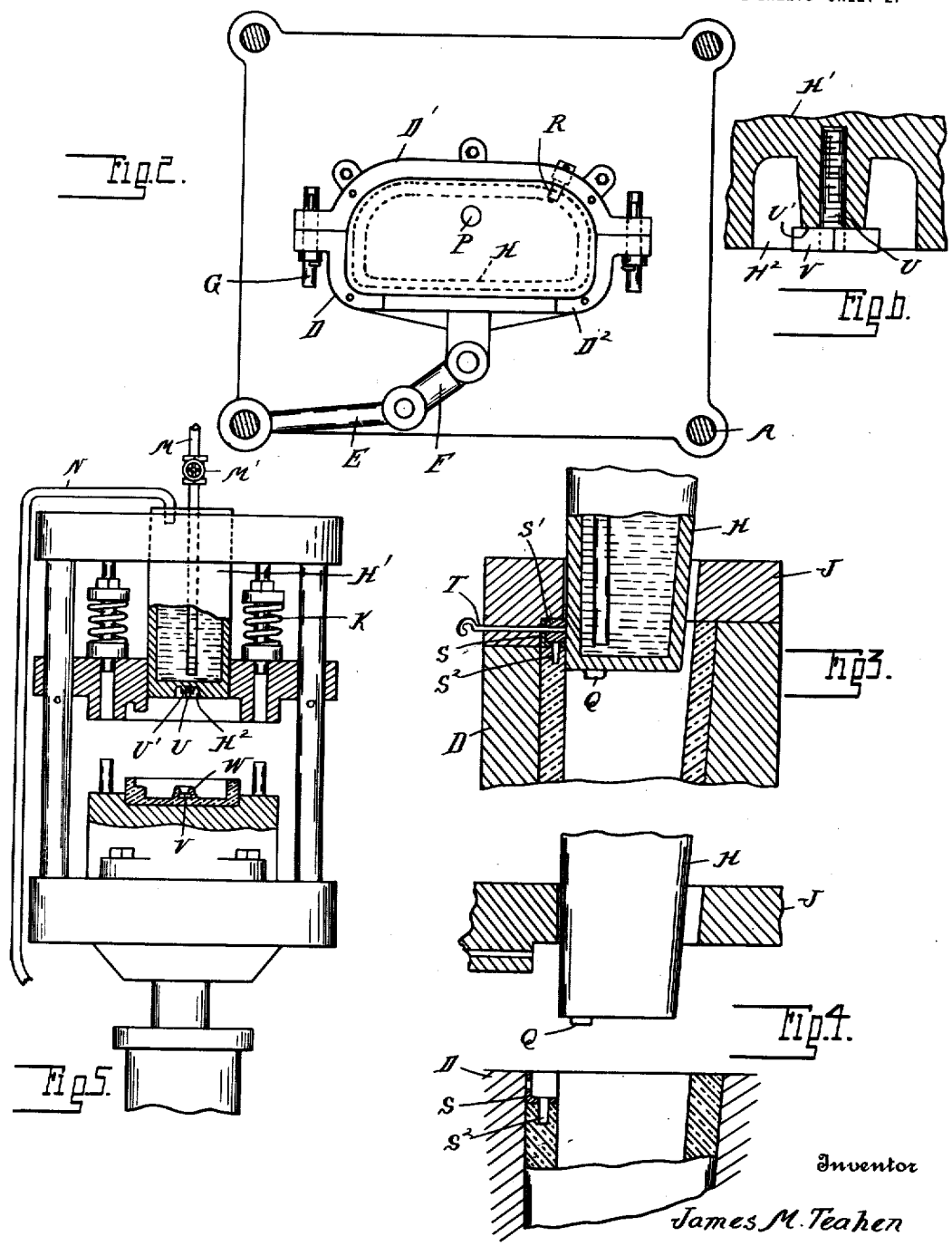

JAMES M. TEAHEN, OF DETROIT, MICHIGAN.

MACHINE FOR FORMING HOLLOW ARTICLES OF CALCIUM RESINATE.

1,270,748.   Specification of Letters Patent.   Patented June 25, 1918.

Application filed November 6, 1916. Serial No. 129,843.

*To all whom it may concern:*

Be it known that I, JAMES M. TEAHEN, a citizen of the United States of America, residing at Detroit, in the county of Wayne and State of Michigan, have invented certain new and useful Improvements in Machines for Forming Hollow Articles of Calcium Resinate, of which the following is a specification, reference being had therein to the accompanying drawings.

The invention relates to the manufacture of articles from calcium resinate, and has more particular reference to the manufacture of flushing tanks and other hollow articles. It is the object of the invention to obtain a construction in which the article may be quickly molded under high pressure, and which may be easily removed from the mold without danger of distortion. The invention comprises various features of construction as hereinafter set forth.

In the drawings:

Figure 1 is a front elevation of the machine;

Fig. 2 is a plan view of the mold;

Fig. 3 is a vertical section showing the manner of anchoring the hanger to the molded tank;

Fig. 4 is a similar view showing the manner of stripping the molded tank from the plunger;

Fig. 5 is a longitudinal section showing the machine adjusted for the molding of the tank covers.

Fig. 6 is an enlarged section of a portion of Fig. 5.

The material from which the articles are to be formed is a plastic compound formed by the fusion of rosin, lime and other ingredients to form a calcium resinate. This material when hot is plastic and readily molded to any desired form, and where the molding is accomplished under high pressure a dense and impervious body is produced. It is, however, necessary to cool the compound before withdrawing the article from the mold, as otherwise a distortion will occur. One of the features of the present invention is the means employed for cooling the mold internally as well as externally. Another feature is the means employed for stripping the molded article from the plunger or core. Still other novel features will be hereinafter referred to specifically.

As shown, A is a frame of a hydraulic press and B is the movable plunger of the press, on which is mounted the table or head C. D is a mold mounted on the head C, which when adapted for the formation of a tank is preferably formed in two or more sections separable from each other. Preferably the one-half section of the mold D' is rigidly secured to the head C, while the other half D² is removable and is carried by a swinging arm E and connecting link F. The sections D' and D² are secured to each other by suitable detachable clamping means, such as indicated at G. H is the core member, which is fixedly mounted upon a top cross-bar I of the frame, in a position registering with the opening in the mold D, the arrangement being such that when the mold is lifted by the upward movement of the plunger B the core H will enter the cavity. To facilitate removal of the molded article from the core, the latter is slightly tapered for draft, the mold D being correspondingly tapered to produce substantially parallel walls in the molded article. J is a cover plate for closing the top of the mold around the core H, said plate also constituting a stripper for disengaging the molded article from the core and being slidably mounted upon the rods A of the frame. The aperture through the cover J is of a size to closely fit the upper portion of the core, but on account of the tapering form of the latter clearance will be provided when the cover is drawn downward on said core. K are springs against which the cover J is pressed in the upward movement of the mold D, said springs yielding to permit the completion of the upward movement, and during the downward movement operating with the stored force to let down the cover J and strip the molded article from the core. The cover J is normally held in a position above the mold when the plunger is depressed by means of a suitable stop on the former, thereby leaving the top of the mold open for the insertion of the plastic material.

With the construction as thus far described in the operation of molding a hollow tank, the proper quantity of a hot plastic material is placed in the mold D, the sections of which have been previously clamped together, after which hydraulic pressure is applied to raise the plunger B. In rising, the mold D first contacts with the cover plate J, and in the further movement this cover plate is lifted with the mold until it is pressed against the springs K.

Still further upward movement will compress the springs which react upon the cover to hold it in firm contact with the mold, while at the same time the stationary core H will force the plastic material from the bottom of the mold upward until it fills the entire mold cavity.

To hold its form the molded material must be chilled before withdrawal from the mold. This can be partially effected through absorption of heat by the metal of the mold, but it has been found that the cooling effect will not extend through the plastic material unless it be permitted to remain for a considerable length of time in the mold. As the output of the machine is dependent upon the speed of operation it is highly desirable to reduce the time of cooling to the minimum, and this I have accomplished by cooling the core as well as the external mold. For this purpose the core is formed as a hollow body with comparatively thin metallic walls, and the interior is filled with water which is kept cool by a circulating system. As shown, M is a water supply pipe controlled by the valve M' and connected with the hollow core H, and N is an outlet pipe from said core through which the heated water is permitted to escape. A branch connection O from the pipe N leads to a sprinkler O', which is directed against the external mold to assist in the cooling. Thus the heat of the plastic material is rapidly absorbed internally as well as externally, with a result that a very short interval is sufficient for complete solidification.

For flushing tanks a number of openings are required in the bottom thereof for the inlet and outlet water connections as well as an aperture in the side for the operating mechanism which trips the flushing valve. The apertures through the bottom are preferably formed by bosses upon the mold or upon the core, and as shown the outlet connection is formed by a boss P projecting upward from the bottom of the mold, while the inlet connection is formed by a boss Q projecting downward from the core. These bosses are of a thickness corresponding to the bottom wall of the tank and consequently by displacing the plastic material will leave the desired apertures. The aperture through the side of the tank cannot be formed in this manner on account of the relative movement of the mold and the necessity of stripping the molded article from the mold. I have therefore provided the section D' of the outer mold with an aperture through which a pin R is inserted, said pin being adapted to be forced in through the plastic material against the surface of the core and to be subsequently withdrawn to permit of stripping.

For supporting the tank when in use a hanger is required, preferably an angle strip located in a recess in the upper edge of the rear wall, said strip having anchoring prongs embedded in the plastic material. To hold the hanger in position during the molding operation the cover J is formed with a recess for receiving the angle strip S, together with a filler strip S' in the angle thereof. Supporting pins T are inserted through apertures in the cover J into engagement with the angle S and filler S', so that these members will be suspended in registration with the mold and with the anchoring prongs $S^2$ projecting downward. Thus when the plastic material is forced upward in the mold cavity by the displacement of the core it will fill about the anchoring prongs $S^2$ and against the under face of the angle strip, while the filler strip S' will form an abutment for resisting the hydraulic pressure.

After the article has been molded by the upward movement of the plunger and outer mold, the plunger is again lowered, whereupon the springs K, pressing against the cover J, will force the latter downward with the outer mold, stripping the hollow molded body from the core H. When the mold is fully lowered the clamps G are removed and the section $D^2$ is swung outward upon the hinge arm E and link F, this permitting the lateral withdrawal of the molded article from the recess in the mold section D'.

For molding the cover of the tank, the operation is substantially the same with the exception that the depth of the recess is much less. I have, however, provided an attachment, the purpose of which is to provide the cover with anchoring means for holding it from displacement in the shipping package, so as to avoid danger of breakage. This attachment consists of a nut for a securing screw which is embedded in a boss formed on the underside of the cover out of the plastic material. To form the molded boss and to hold the nut in position during the molding operation the core H' is provided with a recess $H^2$ on its under side, in which is arranged a downwardly-projecting pin U. On this pin a nut V is placed, being held in position by friction and bearing against a shoulder U' on the pin. With this construction, when the plastic material is forced into the mold cavity it will pass about the nut U and subsequently when the mold is opened said nut will be stripped from the pin U and will be left embedded in the boss W.

What I claim as my invention is:—

1. In a machine for molding hollow articles, the combination with an outer mold and a core member, of a cover for closing the space between said mold and core, means for moving said mold against said cover and for continuing the movement to insert the core within the mold cavity, and means on said cover for detachably mounting a member to be embedded in the plastic material in the mold cavity.

2. In a machine for molding hollow articles, the combination with an outer mold and a core member, of a cover for closing the space between said mold and core, means for relatively moving said mold and core member to insert the core within the mold cavity and to close said cavity with said cover, and means on said cover for detachably mounting a member to be embedded in the plastic material in the mold cavity.

3. In a machine for molding hollow articles, a press comprising a stationary frame and movable head, an outer mold formed in separable sections mounted on said movable head, one of said sections being fixed to said head, and an arm to which the other section of the mold is hinged, said arm being slidably engaged with the stationary frame.

4. In a machine for molding hollow articles, the combination with the outer mold and core, of a cover surrounding said core and adapted to close the space between the same and the outer mold, said cover having a depending portion at one side and the outer mold being correspondingly cut away at its top to receive said portion, and means for detachably securing a member to said depending portion of the cover to permit embedding said member in the plastic material filling the mold cavity.

In testimony whereof I affix my signature.

JAMES M. TEAHEN.